Oct. 12, 1971  C. F. ADICKES ET AL  3,611,630
WHEELED TOY VEHICLE
Filed May 4, 1970  3 Sheets-Sheet 2
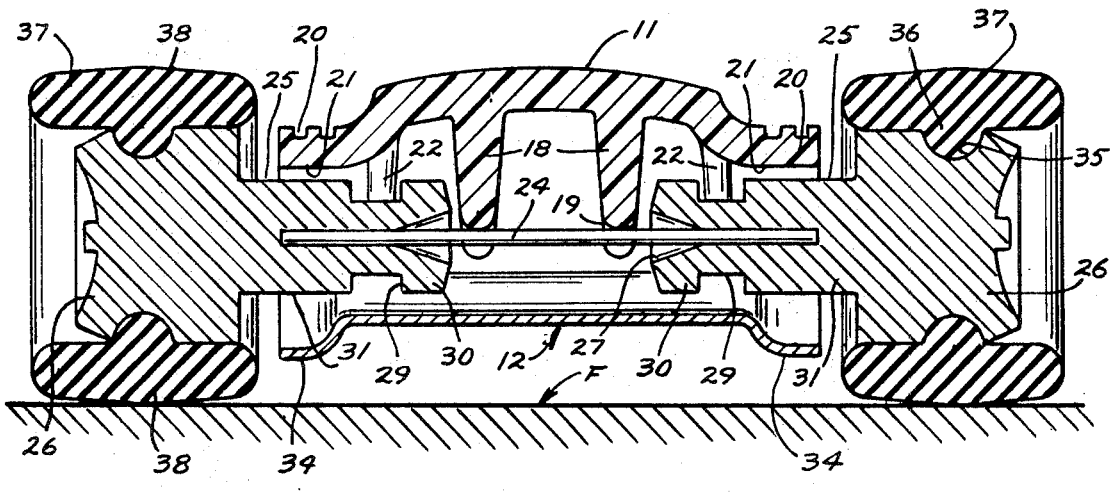
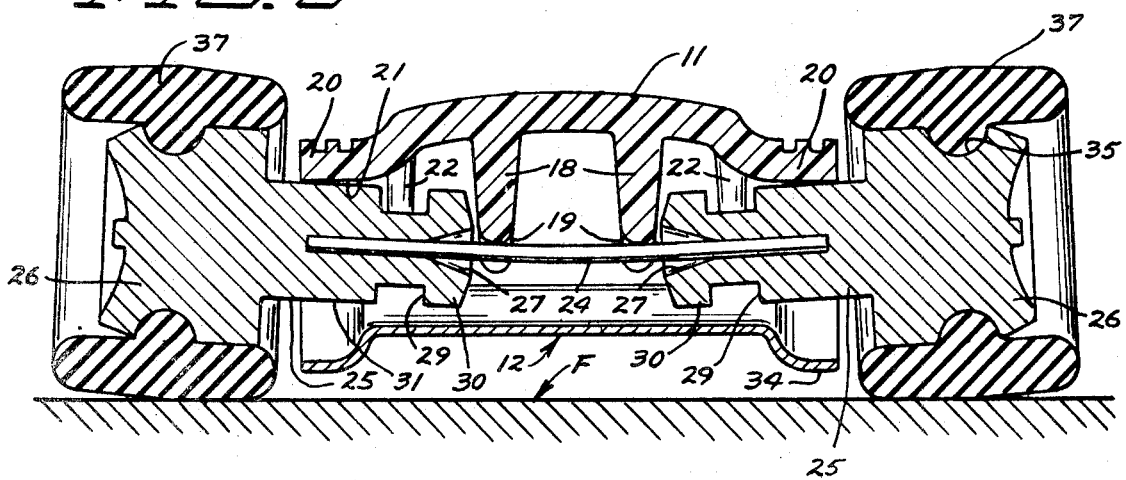
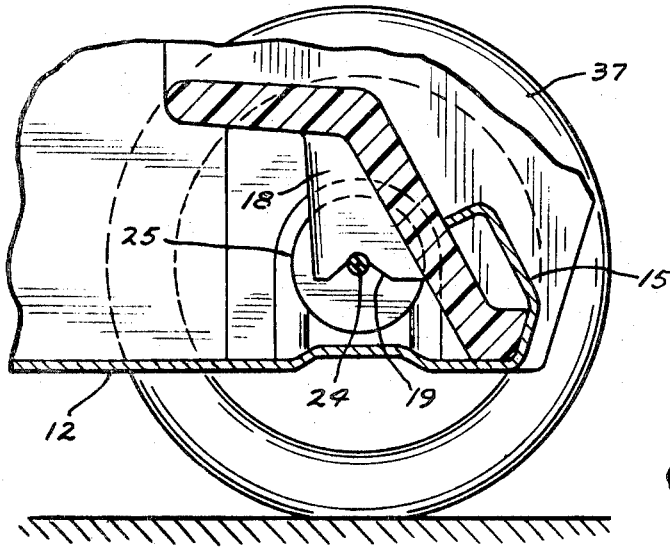
INVENTORS
GARY D. BIES
CECIL F. ADICKES
ATTORNEYS Oct. 12, 1971    C. F. ADICKES ET AL    3,611,630
WHEELED TOY VEHICLE Filed May 4, 1970    3 Sheets-Sheet 3

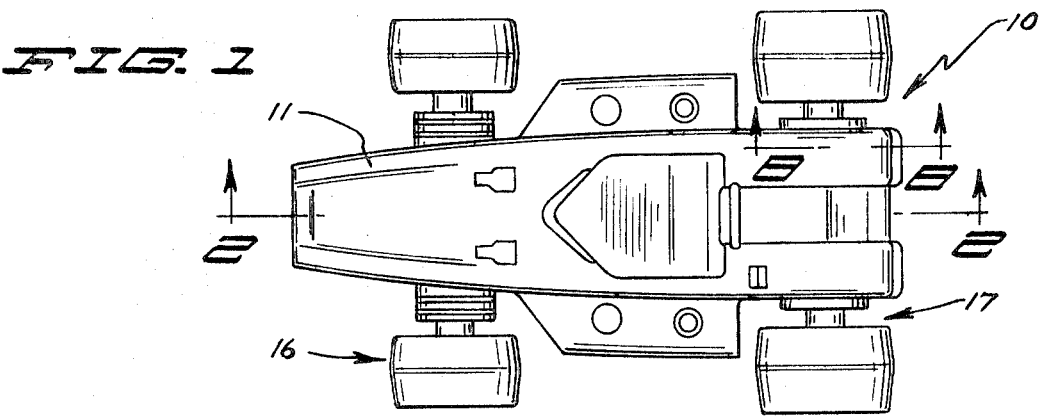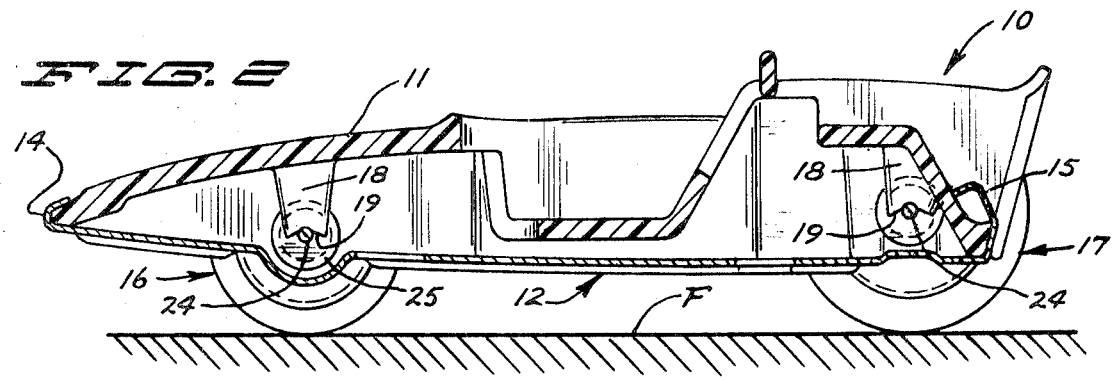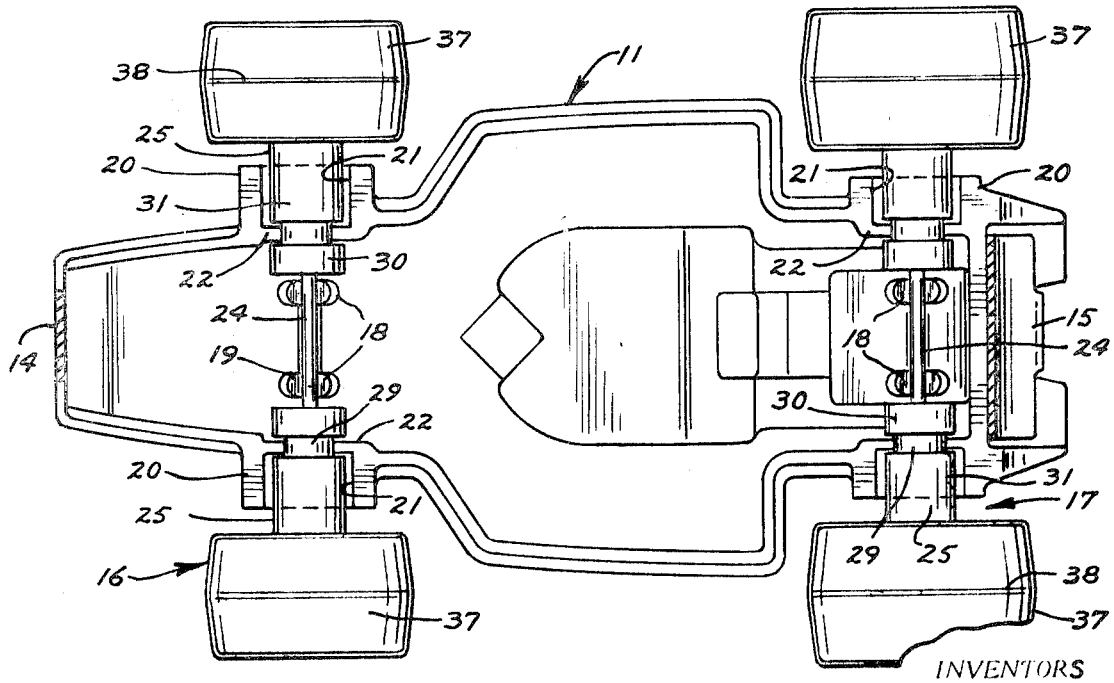

INVENTORS
GARY D. BIES
CECIL F. ADICKES
BY
ATTORNEYS

United States Patent Office 3,611,630
Patented Oct. 12, 1971

3,611,630
WHEELED TOY VEHICLE
Cecil F. Adickes, Playa Del Rey, Calif., and Gary D. Bies, Plymouth, Minn., assignors to Tonka Corporation, Mound, Minn.
Filed May 4, 1970, Ser. No. 34,413
Int. Cl. A63h 17/26
U.S. Cl. 46—201
9 Claims

ABSTRACT OF THE DISCLOSURE

A wheeled toy vehicle in which each wheel and axle assembly is integrally mounted with the axle of tempered resilient spring steel wire having its ends embedded in inwardly extending hub members. The axle rides in a low friction central upper bearing for fast wheel rolling while the said wheel hub members are loosely trapped by body portions of the vehicle to prohibit strain on the axle when diametrical or axial pressures are applied to said members. The hub members carry tires having an outer diameter at least twenty times greater than that of the axle.

BACKGROUND OF THE INVENTION

Where small wheeled but unpowered vehicles are raced as by gravity or by a launching means over a track or other floor surface, it is desirable that the wheels or the axle supporting them be near frictionless for high rotation. One means of providing this result is to use a fine resilient music wire or the like for the axle with the wheels journaled thereon by means of nylon or other relatively friction-free bearings. While such construction offers high speed wheel rotation it is very susceptible to damage as the wheels can be pulled off of the axle or the axle can be bent during normal play destroying the free rolling feature. Also in such a construction coaxially journaled wheels are permitted to rotate at different speeds depending on the friction present at each wheel bearing, thus affecting true straight line travel.

SUMMARY OF THE INVENTION

The primary object of the present invention is to provide a toy vehicle having wheel and axle assemblies which are so constructed and mounted on the vehicle as to provide relatively free rotation and yet which are extremely durable and free from damage or accidental disassembly.

Another object of the invention is to provide a wheel and axle assembly for miniature toy vehicles which is so accurately dimensioned and mounted as to assure straight line movement of the vehicle along a flat surface even though there be no track or other guide means.

Still another object of the invention is to provide a wheel and axle assembly for miniature toy vehicles where the axle has minimal frictional engagement with its mounting bearings and where the wheels have external diameters of very high ratio relative to the axle for high speed movement of the vehicle.

With such objects in view the invention broadly comprises a vehicle having a body mounted on a pair of wheel and axle assemblies, each assembly comprising a length of music wire of resilient tempered steel with its ends integrally carrying wheel members, and a central support extending downwardly from the body and bearing against said length of wire and forming the sole friction bearing means between the body and wheel and axle assembly for high speed rotation.

The invention is further characterized by the provision of coacting structure between the body and wheel and axle assembly which limits flexing of the wire axle to prevent bending or breakage thereof. Such structure is such as to transfer downward pressures on the body to parts of the wheel an axle assembly other than the wire axle.

High speed of the vehicle is further aided by a high relative ratio of over 20 to 1 between outer diameter of the vehicle wheels and the axle.

BRIEF DESCRIPTION OF THE DRAWINGS

FIG. 1 is a plan view of a toy vehicle embodying the novel wheel-axle construction.

FIG. 2 is an enlarged longitudinal vertical section through the vehicle taken on line 2—2 of FIG. 1.

FIG. 3 is an inverted plan view of the vehicle with the bottom pan removed.

FIG. 4 is a transverse vertical section taken through the front wheel-axle assembly with the axle in unstressed normal running condition.

FIG. 5 is similar to FIG. 4 with the axle in stressed condition due to downward pressure applied to the vehicle.

FIG. 8 is an enlarged longitudinal vertical section taken on line 8—8 of FIG. 1.

DESCRIPTION OF THE PREFERRED EMBODIMENT

Figure 6:
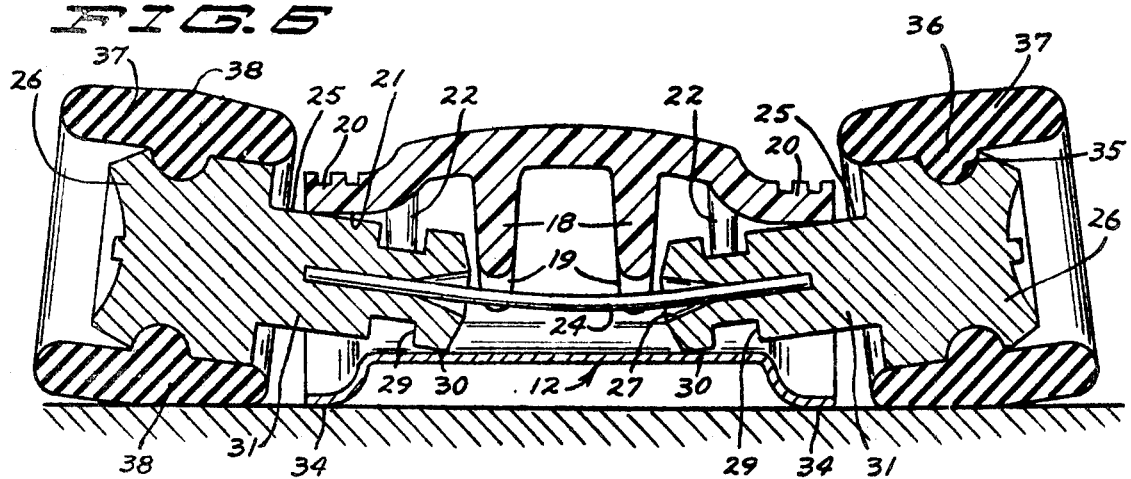
FIG. 6 is similar to FIGS. 4 and 5 with still additional downward pressure applied to the vehicle to the point where the bottom pan contacts the floor surface.
Figure 7:
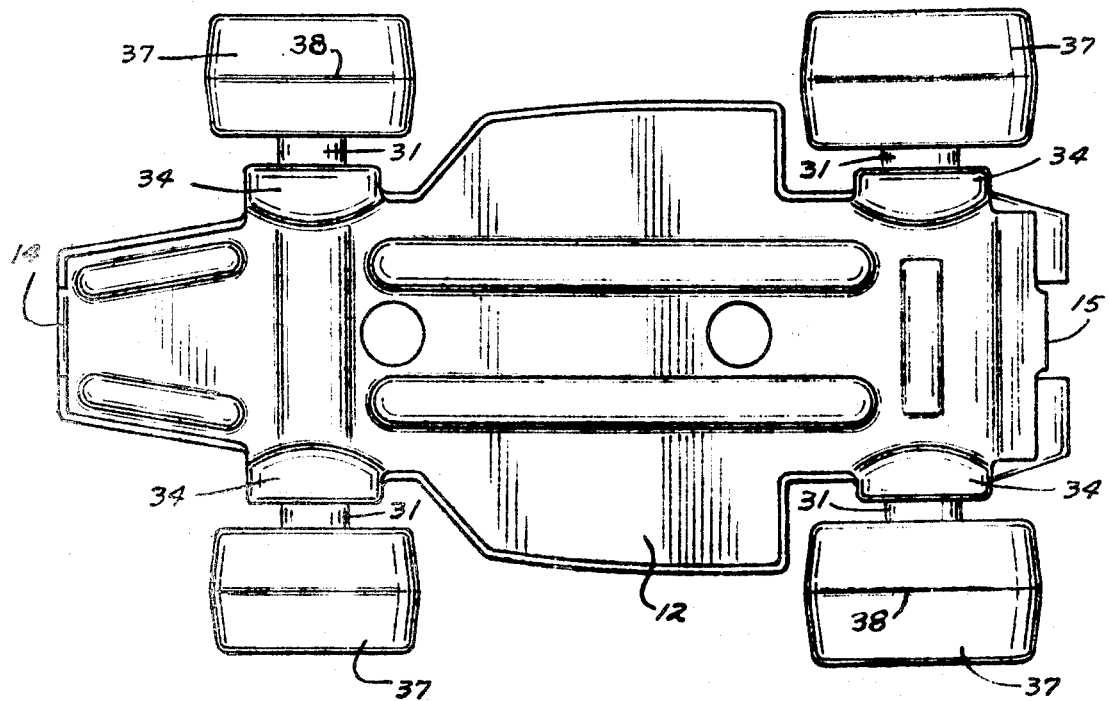
FIG. 7 is an inverted plan view of the vehicle similar to FIG. 3 but with the bottom pan in place.

Referring now more particularly to the drawings, reference numerals will be used to denote like parts or structural features in the different views. The toy vehicle 10 has a shell-like body or chassis denoted generally at 11 formed of a rigid material such as stainless steel and a pan denoted generally at 12 stamped from sheet metal to extend along the underside of the body. The body 11 may be given the shape of any vehicle, the one here shown being in the form of a racing car and the pan 12 preferably covers the entire open underside of the body and is connected to the body by means of clip portions 14 and 15 respectively located at the front and rear ends of the pan.

The body is provided on its underside with means for receiving front and rear wheel and axle assemblies respectively denoted generally at 16 and 17. Except for their relative location on the body, these mounting means are identical. Accordingly only the means mounting the front assembly 16 or to the left in FIGS. 2 and 3 will be described in detail. A pair of identical bearing supports 18 extend downwardly from the central portion of the body in transversely spaced relation. These supports are provided at their lower ends with transversely aligned V-grooves or seats 19.

On either side of supports 18 and aligned therewith fenders 20 are formed in the body. Each fender 20 has a downwardly opening semicircular socket 21 therein. The outer side of socket 21 is open while the inner side is partially closed by a pair of vertical flanges 22.

The front and rear wheel and axle assemblies 16 and 17 are also identical although it may be desirable to provide the rear assembly with slightly larger tires particularly on racing car models. Each assembly has an axle 24 formed of a length of high strength tempered resilient steel wire of a type commonly referred to as music wire. Wire having a gauge of .029 of an inch is found to be very satisfactory. A generally cylindrical hub member 25 having an enlarged wheel portion 26 at one end and an axial passage 27 in the other end is press fit one on each end of axle 24 with the axle extending into the passage to form an integral unit. The inner section of the hub member 25 mounted on the axle 24 has a peripheral groove 29 formed therein dividing that section into a captive portion 30 and a bearing portion 31. Grooves 29 are slightly somewhat greater in width than the flanges 22 on the body but the centers of the grooves of the hub members on each assembly are spaced apart substantially the same distance as the centers of the aligned flanges 22, as best seen in FIG. 4.

In assembling the vehicle, the body 11 may be placed in an inverted position. Assemblies 16 and 17 are then placed in their respective holding means in the body as shown in FIG. 3. So positioned axle 24 is at rest upon the seats 19 of supports 18 and each groove 29 fits between the flanges 22 on the corresponding side of the body 11. The pan 12 is then snapped onto the body by means of clip portions 14 and 15.

The pan 12 serves two primary functions. First, while it is disposed in spaced relation below the hub portions 30 and 31, the spacing is such as to allow contact of said portions with the pan when the body 11 is lifted before axle 24 can escape from the confines of seats 19. Accordingly, the pan while permitting vertical play of the wheel and axle assemblies 16 and 17 it does retain them in mounted position longitudinally of the body. Secondly, pan 12 is provided with a downwardly offset skid 34 adjacent each wheel 26 adapted to engage and press against the floor surface when extreme downward pressure is applied to the body 11.

Each wheel portion 26 is provided with a peripheral groove 35 adapted to receive and seat a bead 36 molded on the inside of a tire 37 formed of resilient compressible material such as rubber or neoprene. The tires are forced onto the wheels until bead 36 is seated. The outer transverse contour of the tires is a broad V for minmial contact of the tire with the floor surface F at the apex 38.

FIGS. 2 and 4 show the condition of the axle during normal operation of the vehicle. As the vehicle is activated across a floor surface or track by a mechanical launcher, gravity or pushing, unusually high speed can be reached due to the minimal frictional contact between the axles and the body. The only engagement is in the seats 19 and this is best shown in FIG. 8. There is very high ratio in the diameters of the tires 37 to axle 24 in the range of 20–25 to 1. Additionally, tire to floor surface friction is greatly reduced by virtue of the line contact of apex 38 with the floor surface.

The axle and wheel assemblies and mountings here disclosed assure vehicle movement along a straight path so that a track is not needed where straight line travel is desired.

The axle 24 not only provides for high speeds but due to its resiliency it also serves as a spring or shock absorber allowing the individual wheels to yield upwardly over irregularities in the floor surface to give the vehicle a free floating travel action.

Several features of the construction provide for maximum protection of the wire axle 24 against bending or breakage and against removal of the hub members 25 therefrom. As hereinbefore pointed out the axle wire is high strength tempered steel. Its tight press fit over a substantial portion of its length in passage 27 secures the hub members firmly thereon. However, endwise removal of hub members 25 from axle 24 is further prohibited by the fact that if a wheel is pulled outwardly in an axial direction the captive portion 30 integral with the wheel will engage flanges 22, thus removing all axial tension from the axle.

The axle is also protected against permanent deformation when bending stresses are applied thereto. When slight downward pressure is applied to the body, as shown in FIG. 5, the axle will bend until the fenders 20 come into engagement with the bearing portions 31 of the hub members. At this point a portion of the downward pressure on the axle and wheel assembly will be transferred from the axle 24 to the bearing portions 31. Accordingly a two-stage bearing is provided with minimal contact for high speed when no load is placed on the body and maximum bearing engagement when downward pressure is applied to the body.

As downward pressure on the body is further increased such as when a child steps on the vehicle or the like, the body will be further depressed until the skids 34 come into contact with the floor surface. This is permitted by further bending of axle 24 and compression of tires 37. The hub members 25 tilt further until the captive portions 30 come into engagement with the pan 12. The condition of the axle and wheel assembly with the vehicle bottomed out is shown in FIG. 6. This is the position of maximum deflection of the axle and is well within its limits of elasticity so that the axle will neither break or take a permanent bend.

The structure also limits bending of the axle in other directions to protect the same. Feners 20 and flanges 32 limit fore and aft tilting movement of the hub members to retain the axle 24 in the seats 19.

Having now therefore fully illustrated and described our invention, what we claim to be new and desire to protect by Letters Patent is:

1. In a toy vehicle,
   (a) an elongated body,
   (b) said body having a pair of axle support means projecting downwardly in longitudinally spaced transversely centered positions,
   (c) a pair of wheel and axle assemblies,
   (d) each said assembly comprising a straight wire axle having wheels integrally mounted on each end thereof,
   (e) said axle supports resting one on each axle with the wheels disposed on each side of the body,
   (f) said axle being of tempered highly resilient steel whereby as downward pressure is applied to the body the axle will flex allowing the body to move downwardly between the wheels and as the pressure is relieved the axle will return to its straight condition raising the body to its normal position, and
   (g) means connected to the obdy and extending under each assembly to restrain it against longitudinal movement relative to the axle supports.

2. The subject matter of claim 1 wherein the wheels have inwardly extending hubs and the body has fenders disposed over and adapted to contact the hubs to resist downward movement of the body.

3. The subject matter of claim 1 wherein said body connected means comprises a bottom pan extending along the bottom of the vehicle and said pan having downwardly projecting skid means adapted to contact a vehicle supporting surface to limit downward movement of the body.

4. In a toy vehicle,
   (a) an axle of high strength tempered resilient flexible wire,
   (b) a pair of wheel members integrally mounted one on each end of the axle,
   (c) an elongated body extending over the axle and perpendicular thereto and having a bearing support projecting downwardly therefrom which has a seat near its lower end for receiving the central portion of the axle and providing a bearing surface thereon,
   (d) means on the body extending under the seat to retain the axle therein,
   (e) and stop means on each side of the body positioned to engage the wheel members and limit downward movement of the body when downward pressure is applied thereto to flex the axle.

5. The subject matter of claim 4 wherein
   (a) each wheel member has a concentric hub portion extending inwardly toward the axle,
   (b) each hub portion having an outwardly facing shoulder, and
   (c) flange means on the body positioned outside of each shoulder to engage the shoulder and limit outward m ovement thereof.

6. The subject matter of claim 5 wherein said flange means are positioned to engage the shoulder during outward pulling on the wheel before any tension is exerted on the axle.

7. In a toy vehicle having a body supported on wheel-axle assemblies,
   (a) each wheel-axle assembly comprising a length of tempered resilient wire of 20 to 40 thousandths of an inch in diameter, and having a pair of coaxial wheels integrally mounted one on each end thereof,
   (b) said body having bearing portions resting upon the central portion of each wire length whereby as downward pressure is applied to the body the wire will flex allowing the body to move downwadrly,
   (c) and a pan member secured to the body to extend under the wire lengths and having portions adapted to contact a supporting surface when the body has moved downwardly a short distance.

8. The subject matter of claim 7 wherein each wheel carries an encircling tire member with an external diameter having a ratio in excess of 20 to 1 with respect to the wire diameter.

9. The subject matter of claim 8 wherein the peripheral surface of the tire member is V-shaped in cross section for minimal surface contact with the floor.

References Cited
UNITED STATES PATENTS

| | | | |
|---|---|---|---|
| 2,552,824 | 5/1951 | Thurman | 46—221 |
| 2,749,662 | 6/1956 | Bottleman | 46—221 X |
| 2,838,875 | 6/1958 | Hammon et al. | 46—210 |
| 3,264,780 | 8/1966 | Doe | 46—201 |
| 3,483,654 | 12/1969 | La Branche et al. | 46—201 |

LOUIS G. MANCENE, Primary Examiner

R. F. CUTTING, Assistant Examiner

U.S. Cl. X.R.

46—221